G. H. SMITH.
BORING MACHINE.
APPLICATION FILED OCT. 21, 1909.
959,083.
Patented May 24, 1910.
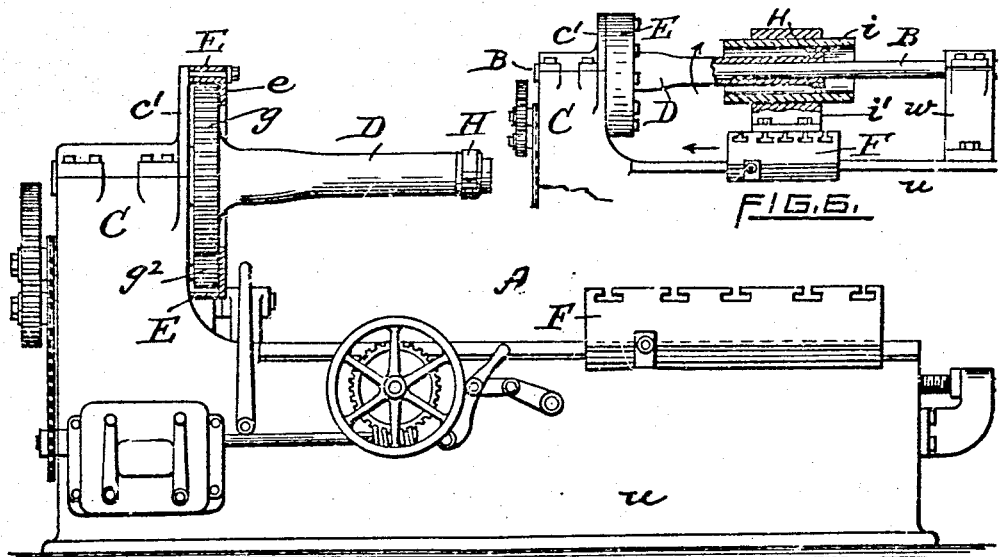
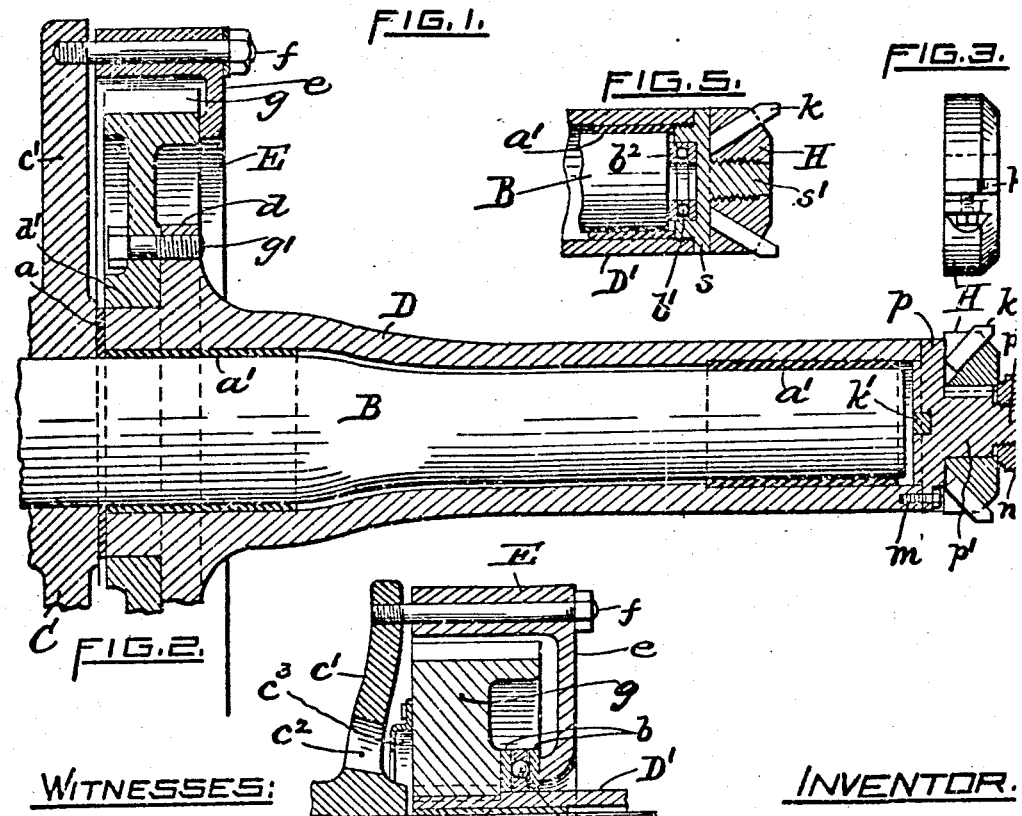
WITNESSES:
C. J. Hannigan
Eva Lavoie
INVENTOR.
George H. Smith.
By Geo. H. Remington
Atty.

UNITED STATES PATENT OFFICE.

GEORGE H. SMITH, OF PROVIDENCE, RHODE ISLAND, ASSIGNOR TO BEAMAN & SMITH COMPANY, OF PROVIDENCE, RHODE ISLAND, A CORPORATION OF RHODE ISLAND.

BORING-MACHINE.

959,083.   Specification of Letters Patent.   Patented May 24, 1910.

Application filed October 21, 1909. Serial No. 523,905.

*To all whom it may concern:*

Be it known that I, GEORGE H. SMITH, a citizen of the United States, residing at Providence, in the county of Providence and State of Rhode Island, have invented certain new and useful Improvements in Boring-Machines, of which the following is a specification.

This invention relates to boring-machines and consists in the novel manner of mounting, supporting and driving the cutter-carrying or boring-spindle, all as more fully hereinafter set forth and claimed.

In machines or tools of the general class referred to, and as usually devised, each is provided with a revolubly-driven central boring-bar supported at both ends, its rear end being centered in the tail-stock spindle.

In machines more especially adapted for "blind" or "snout"-boring, whereby the object to be bored has one of its ends or head closed, or possibly having a comparatively small central hole through it, inadequate for the passage of a boring-bar, as for example, in the case of certain trunk-engine cylinders, the boring cutters are mounted in the outer or free end of the bar, the latter then constituting a revoluble beam having a support at one end only. In some cases, however, the cutter-bar is extended, its rear end portion being revolubly supported in a bearing longitudinally adjustable on the bed of the machine.

There are objections to such former methods and practice, for example, it is almost impossible to fasten the bar in a revoluble head or chuck so as to prevent appreciable lateral deflection at its outer unsupported end, this defect being especially noticeable in case a comparatively heavy cut or "chip" is being made; and the hole thus bored will not be true or uniform throughout its length. In order to insure greater accuracy in boring holes in such articles, a relatively lighter or finer "feed" and "chip" are used, thereby necessitating a correspondingly greater number of "cuts" in removing the stock from the inner surface of the wall being acted upon so as to produce a bore of the desired diameter. Obviously, too, such boring operation materially increases the length of time consumed and also adds to the cost of attendance. It may be added that the work being bored is securely fastened to a carriage or platen slidably mounted on the bed of the machine and having its movements controlled by a feed-screw in a well-known manner.

In case the machine has a comparatively long, revoluble bar whose rear end is mounted in a bearing, as before stated, sufficient freedom or play must be provided between the adjacent surfaces of the bar and its bearing to allow for and maintain proper lubrication. As thus devised, more or less lateral vibration is liable to occur at that end of the bar during its cutting or abrading operation, due to inequalities in the stock or metal, variations in the cut or feed, &c.; in fact, the bar is subjected to varying degrees of torsion by reason of such unevenness in the stock, thus producing irregularities in the boring of the hole, since the cutters then work in an intermittent manner, or "chatter", as it is termed.

The object I have in view is to overcome the above named disadvantages in a simple and efficient manner by providing boring-machines with improved means whereby the cutter-carrying spindle is constructed to rotate without lateral vibration or deflection, since its axis is maintained in true and rigid alinement. As thus devised, the machine is capable of producing a materially increased amount of work and at a considerably reduced cost. Moreover, the holes thus bored are true and accurate to size or gage throughout their length.

In the accompanying sheet of drawings, Figure 1 represents a side elevation of a boring-machine embodying my present improvements, viewed from the front. Fig. 2 is a longitudinal sectional view, in enlarged scale, taken through the center of the improved boring-spindle, &c. Fig. 3 is a top plan view of the cutter-head, detached, corresponding with Fig. 2. Fig. 4 is a partial longitudinal central sectional view taken through the front or driving-head, showing a slight modification in construction. Fig. 5 is a similar view, showing the construction of the outer or rear end portion of the bar and spindle members shown in Fig. 4, being in fact a continuation of the latter, and Fig. 6 is a side elevation in partial section and in reduced scale, showing a further modification of the invention as adapted to boring-machines.

In order to illustrate the adaptability of my invention, I have represented in Fig. 1 a horizontal boring-machine of well-known type, wherein $u$ indicates the bed, C the driving-head, and F a work-holding table or platen, slidably supported on the bed, and adapted to be actuated by a feed-screw, substantially as common.

In lieu of the usual revolubly driven boring-bar mounted in the head or driving end of the machine, I employ a central bar member B, rigidly secured in the head portion C, the bar extending rearwardly from the latter a suitable distance, the rear end portion being unsupported, substantially as represented in Figs. 1 and 2.

The revoluble boring-spindle proper, D, consists essentially of a tube mounted and supported on said bar B. The front end portion of the spindle may be provided with an integral flange, $d$, (Fig. 2) and hub $d^1$, on which latter the driving-gear $g$ is fitted and is secured to the spindle by means of bolts $g^1$ passing transversely through it and said flange.

The cap member, which assists in securely clamping and holding the bar B in position in the head or frame C, is provided with a radially extending flange $c^1$, to which is secured by bolts or studs, $f$, an annular housing member, E, the latter having a narrow flange, $e$, at its rear end, whose inner face is turned off true to serve as a bearing, in connection with the adjacent portion of the gear $g$, for maintaining the revoluble spindle in position and preventing rearward movement. A collar, $a$, may be interposed between the front end of the spindle and the rear face of the head C to receive the force or working end thrust of the spindle. The spindle may be provided interiorly at each end with a fixed lining or bushing, $a^1$, of suitable anti-friction metal, and bored to fit the corresponding portions of the stationary center bar.

The rear or unsupported free end of the spindle extends a short distance beyond the bar and is provided with a cap member, $p$ (Fig. 2), removably secured thereto by bolts $m$ and key $k^1$. A central shank, $p^1$, extends from the cap on which is fitted and keyed a collar or head H, having suitable cutters or tools, as $k$, mounted therein. A screw-threaded stem, $p^2$, projecting rearward from said shank part, in connection with a nut, $n$, serves to maintain the cutter-head in place longitudinally of the spindle.

The tubular boring-spindle D is or may be actuated by a pinion-gear $g^2$ meshing into the gear $g$. The power or driving force employed may be transmitted to the small gear $g^2$ in any suitable or well-known manner.

In lieu of the construction shown in Fig. 2, the flange $d$ may be omitted and the gear $g$ keyed direct to the reduced end of the boring-spindle $D^1$, as indicated in Fig. 4, and an anti-friction bearing, consisting of laterally separated, flat, annular plates $b$ and interposed balls $b^1$, located between the face of the gear's hub and the adjacent face of the housing's flange $e$. The other end portion of the spindle may be provided with an inclosed thrust-bearing, also formed of plates $b^2$ and balls $b^1$, disposed between the adjacent faces of the rigid bar B and cap $s$ screwed to the end of the spindle. See Fig. 5. The drawing also represents the tool-carrying head H as screwed to the shank $s^1$ of the cap member.

In the modification shown in Fig. 6, the stationary center bar B is elongated and extends through the open rear end of the boring-spindle D and is rigidly clamped or secured in a fixed support, $w$. In this case the tool-carrying head H is secured to the exterior of the spindle. The drawing also shows, sectionally, a piece of work, i. e. a hollow cylinder, $i$, fixed in a holder $i^1$, in turn secured to the platen F. The revolubly driven boring-spindle carrying the tool-head is represented in the act of boring the cylinder while it is being advanced in the arrow direction. As thus arranged, the rigidly held center bar is not subjected to torsion, while vibration or deflection of the bar is practically eliminated, thereby, through the medium of the driven boring-spindle revolubly supported thereon, adapting the machine to produce more accurate, uniform and truer work and in a more expeditious manner.

It is obvious that machines thus equipped with the invention may be readily employed for abrading or grinding away the metal and also for polishing the inner surfaces of tubes, hollow cylinders, &c., by simply providing the head portion H of the spindle with suitable other tools and increasing the speed of rotation correspondingly.

The improved device forming the subject of this application for patent is well adapted to be employed in vertical boring-machines, in which case I prefer to construct and arrange the boring-spindle $D^1$, &c., substantially as represented in Figs. 4 and 5; obviously the longitudinal axes of the bar and spindle members would then, however, be disposed in a vertical plane. The upper or outer end of the driving-gear, $g$, secured to the corresponding end of the spindle, may be provided with an annular flange, $c^3$, having an inturned lip, thereby forming an open reservoir for oil or suitable other lubricant; access to the reservoir being had through an opening, $c^2$, formed in the extension $c^1$; the latter, through the medium of the flanged housing E secured thereto, serving to support the weight of the spindle $D^1$ and the several parts secured to it.

I claim as my invention:

1. In a boring-machine, the combination of a stationary center-bar rigidly supported at its head end only, a driven tubular boring-spindle revolubly mounted thereon and adapted for holding cutting or abrading tools in its free end, and means for driving the said spindle.

2. In a machine of the character described, the combination with a center bar rigidly secured in the head-stock or analogous member and extending rearwardly therefrom without other support, of a tubular drive-spindle revolubly mounted on the bar, means for actuating the spindle, and means adapted for removably securing cutting tools to the spindle.

3. In a machine of the character described, the combination with a central bar and holding means adapted for rigidly maintaining it in a normally stationary position, of a tubular cutter-carrying spindle supported by and revolubly mounted on said bar.

4. In a machine of the character described, the combination of a central bar member rigidly held against longitudinal and rotary movements, a power-driven, tubular, cutter-carrying boring-spindle revolubly mounted and supported on said bar, and means adapted to prevent endwise movement of the thus mounted spindle.

5. In a machine of the character described, the combination of a rigidly supported central bar member having a portion thereof extending outwardly beyond its support, a cutter-carrying tubular spindle or sleeve revolubly mounted on said bar's extension, and suitably mounted anti-friction bearings arranged with relation to said bar and spindle members, adapted to prevent endwise movement of the spindle.

6. In a machine of the character described, the combination with a stationary central bar and a tubular work-spindle revolubly mounted thereon, of a cap member secured to the outer or free end of said spindle and carried thereby, a cutter-head secured to said cap, and a thrust-bearing interposed between the adjacent ends of said cap and bar members.

7. In a machine of the character described, the combination with a stationary, rigidly supported center bar and an annular boring-spindle revolubly mounted and supported thereon, of a revoluble driving-gear secured to the front end of said spindle, and means adapted to receive the working end thrust of the spindle.

In testimony whereof, I have affixed my signature in presence of two witnesses.

GEORGE H. SMITH.

Witnesses:
CALVIN H. BROWN,
GEO. H. REMINGTON.